United States Patent [11] 3,619,272

| [72] | Inventors | Thomas H. Shepherd |
| | | Hopewell; |
| | | Murray H. Reich, Princeton, both of N.J. |
| [21] | Appl. No. | 664,963 |
| [22] | Filed | Sept. 1, 1967 |
| [45] | Patented | Nov. 9, 1971 |
| [73] | Assignee | Princeton Chemical Research, Inc. |
| | | Princeton, N.J. |

[54] METHOD FOR COATING POLYOLEFIN OR PAPER SUPPORTS WITH CHLORINATED BUTENE-1 POLYMER COATINGS
7 Claims, No Drawings

[52] U.S. Cl. .............................................. 117/138.8UA,
117/138.8 E, 117/138.8 F, 117/145,
117/161 UH, 117/161 UF
[51] Int. Cl. ................................................. B44d 1/098,
B32l 27/08
[50] Field of Search ........................................ 117/161 H,
161 UH, 138.8 U, 138.8 E, 138.8 F, 145

[56] References Cited
UNITED STATES PATENTS
2,962,387 11/1960 Noeske et al. ................. 117/161 UHH

| 2,968,637 | 1/1961 | Bowers | 117/161 UHH |
| 3,192,188 | 6/1965 | Orthner et al. | 117/155 U |
| 3,326,834 | 6/1967 | Signorelli et al. | 117/155 U |
| 3,326,835 | 6/1967 | Signorelli et al. | 117/155 U |
| 3,366,589 | 1/1968 | Hammer et al. | 117/155 U |
| 3,458,350 | 7/1969 | Barton et al. | 117/145 |

Primary Examiner—William D. Martin
Assistant Examiner—J. E. Miller, Jr.
Attorney—Ostrolenk, Faber, Gerb and Soffen ABSTRACT: Method for coating various substrates, and coating compositions employed therein, incorporating, as a principal constituent thereof, a chlorinated butene-1 polymer prepared by chlorination of a polymer having a melt index of from 0.1 to 60, and comprising from 20 percent to 95 percent by weight isotactic polymer. The chlorinated material contains from 3 percent to 70 percent by weight chlorine. Coatings thus provided are useful as adhesives or primer coats for polyolefin films or sheets, or as protective coatings for paperboard or other paper stock materials.

METHOD FOR COATING POLYOLEFIN OR PAPER SUPPORTS WITH CHLORINATED BUTENE-1 POLYMER COATINGS

CROSS-REFERENCE TO OTHER APPLICATIONS

The chlorinated butene-1 polymer coating constituents hereof may be prepared by the solution chlorination of isotactic polybutene-1, employing the method described in copending application Ser. No. 595,014 filed on Nov. 17, 1966, now U.S. Pat. No. 3,546,195. The waxes and interpolymers which may be blended with such chlorinated butene-1 polymers to form desirable coating compositions within the scope of the invention are further described in copending application Ser. No. 671,568 filed on Sept. 29, 1967, now abandoned, and Ser. No. 430,158 filed on Feb. 3, 1965 now abandoned. The disclosures of such applications, all of which are owned by the assignee of the present invention, are incorporated herein by reference.

BACKGROUND OF THE INVENTION

1. Field of the Invention

This invention relates to a method for coating various substrates with chlorinated butene-1 polymer-containing coatings, to impart improved properties to the coated substrates or to facilitate adhesion of such substrates to one another. More specifically, it relates to the coating of polyolefin substrates to improve the bonding characteristics thereof and thereby facilitate adhesion of paints, printing inks and like substances thereto. The invention further pertains to the coating of paperboard or other paper stock materials to impart improved water vapor transmission resistance, coating adhesion, tensile strength, flexibility and gloss characteristics thereto. Finally, the invention involves coating compositions containing such chlorinated butene-1 polymers for use in the preceding and other applications.

2. The Prior Art

For many years efforts have been made to improve the adhesive characteristics of nonionic substrate materials, particularly those comprising polyethylene, polypropylene, or the like. Such polyolefin materials are known to be extremely nonreceptive of adhesives, pigments and other decorative or like coatings at ordinary pressures and temperatures. For this reason, materials such as polyethylene and polypropylene films are, in fact, often used as release agents for adhesives.

A number of techniques have heretofore been developed for treating polyolefin substrates to render their surfaces at least somewhat receptive to bonding. Such techniques include, for example, flame treatment, corona discharge, and chemical treatment employing oxidizing acids or the like. It is among the objects of the present invention to provide a coating technique and composition for simply and efficiently improving the bonding characteristics of polyolefin and similar nonionic films to facilitate improved coating and laminating thereof.

The present invention is additionally directed to the application of various coatings to packaging materials to impart improved characteristics thereto. Such coatings have heretofore been utilized to impart, for example, increased tensile strength, flexibility and gloss characteristics to paper stock substrates, to improve the creased barrier properties of such coated materials, and to improve adhesion of pigments and other additives to the substrates to facilitate the application of further coatings and/or laminations thereon.

In the case of wax-containing coating compositions employed, for example, in the coating of paper and paperboard used for the manufacture of food wrappers and paper cartons, various additives have heretofore been employed to impart improved packaging material characteristics. Thus, ethylene/vinyl acetate copolymer compositions (e.g. those marketed as ELVAX 150, ELVAX 250, and ELVAX 420) are currently available as commercial additives for upgrading various waxes used for coating purposes. More recently, it has been proposed, in U.S. Pats. Nos. 3,326,834 and 3,326,835, granted on June 20, 1967, to add polybutene-1 resins to petroleum waxes to impart improved creased barrier properties to paper stocks coated therewith, as compared with similar substrates coated with wax compositions incorporating, for example, the ethylene/vinyl acetate copolymer additives referred to hereinabove.

It has been found that paper stocks treated with wax blends incorporating materials such as those described above are not entirely satisfactory for commercial purposes, coatings containing various wax/polybutene-1 resin blends, for example, imparting lower tensile strength to the coated stocks than possessed by the uncoated materials per se. In accordance with one embodiment of the present invention, it has been found possible to obviate the deficiencies of previously known waxcontaining coatings for paper stock materials, and to provide novel coatings which impart improved tensile strength and barrier properties to the coated stock material while simultaneously increasing the adhesive, flexibility and gloss characteristics thereof.

In addition to the problems referred to hereinabove, other objects and advantages of the present invention will be apparent from consideration of the following detailed description including specific illustrations of preferred embodiments of the coating method and composition hereof.

SUMMARY OF THE INVENTION

In accordance herewith, it has been found possible to markedly improve a number of physical and chemical properties of various sheet material substrates by coating the same with a coating composition, the principal constituent of which is a chlorinated butene-1 polymer prepared by chlorination of a polymer of butene-1 having a melt index of from about 0.1 to 60, and incorporating from 20 percent to 95 percent by weight isotactic polymer, the chlorinated material containing from about 3 percent to 70 percent by weight chlorine. The chlorinated butene-1 polymer employed in the practice of this invention may be applied by itself to the substrate to be treated in solution or hot melt form, or may be blended with petroleum waxes and/or resinous or other additives, depending upon the particular substrate to be treated and application desired. For example, the chlorinated polybutene-1 may be blended with homopolymers, copolymers or terpolymers of ethylene, propylene, 1-butene and other α-olefins or with ethylene copolymers with vinyl acetate or acrylate monomers along with the other aforementioned additives.

The chlorinated butene-1 polymer-containing coatings may be applied to a wide variety of sheet material substrates to improve the characteristics thereof including polyolefin films constituted of, for example, polybutene-1, polyethylene, and polypropylene; and paper stock materials such as kraft paper, glassine paper, pouch paper, parchment paper, milk paperboard, cardboard or chipboard, collectively referred to herein as paper stock materials. Other plastic film and sheet materials which may be treated with the chlorinated butene-1 polymer coatings of the present invention include those constituted of vinyl polymers, e.g., polyvinyl chloride, vinyl chloride/vinyl acetate copolymers, polyvinyl fluorides and polystyrenes; vinylidene polymers, e.g., the homopolymers and copolymers of vinylidene chloride (Saran); polyesters, e.g., polyethylene terephthalate (Mylar); acrylic resins, e.g., polymethyl acrylate, polymethyl methacrylate, or polyacrylonitrile; polycarbonates; and cellulose esters, such as cellophane.

While the following discussion principally pertains to the preferred treatment of polyolefin substrates and paper stock materials, it should be understood that, as noted hereinabove, the present invention includes within its scope the treatment of other types of sheet material substrates with chlorinated butene-1 polymer coatings to improve the physical and/or chemical properties thereof.

PREFERRED EMBODIMENTS OF THE INVENTION

In the following detailed discussion of preferred embodiments of the invention, all parts and percentages are given by weight and all temperatures are specified in °C, unless otherwise indicated.

As noted above, the chlorinated butene-1 polymer coating materials hereof are suitably prepared by the solution chlorination of butene-1 polymers employing, for example, the method disclosed in the aforesaid application Ser. No. 5,95,014. The butene-1 polymers to be thus chlorinated for use in accordance with the present invention have melt indices of from about 0.1 to 60, preferably from about 05. to 20, and contain from about 20 percent to 95 percent, preferably 40 to 92 percent, crystalline or isotactic polymer. The chlorinated materials have chlorine contents of from about 3 percent to 70 percent, preferably from about 5 percent to 50 percent by weight.

It will further be understood that the chlorinated butene-1 polymers employed in the practice of this invention may comprise either homopolymers of butene-1 or copolymers of such monomer in admixture with up to about 50 percent, and usually, from about 5 to 45 percent, of a monomer copolymerizable therewith. Co-monomers which may be so employed constitute ethylenically unsaturated monomers such as ethylene, propylene, butadiene, isoprene, or the like.

The crystalline butene-1 polymers described may be made by standard polymerization techniques employing, for example a Ziegler catalyst system incorporating a group IV metal salt and an organometallic co-catalyst. The polymerization techniques described in the above Pats. No. 3,326,834–5 may, for example, be so employed.

As noted above, the chlorinated butene-1 polymer materials may be coated by themselves upon the substrate to be treated, or may be blended with other materials particularly useful for coating particular substrates to impart desired properties thereto. When the chlorinated butene-1 polymers are employed per se they may be applied in hot melt form or dissolved in a appropriate solvent. Solvents so useful include those which may be employed in the chlorination reaction, suitably a halogenated hydrocarbon solvent such as carbon tetrachloride, chloroform, tetrachloroethylene, etc. Alternatively, the chlorinated butene-1 polymer may be recovered from the chlorination reaction mixture and subsequently redissolved in an organic solvent compatible therewith for application in solution form. Solvents which may be so used include the various aromatic solvents, e.g., benzene, toluene or the xylenes; aliphatic ketone solvents e.g., acetone, methyl ethyl ketone or methyl isobutyl ketone; or carboxylic or heterocyclic ester solvents, e.g., ethyl acetate or tetrahydrofuran; or mixtures of the preceding materials.

Alternatively, the chlorinated butene-1 polymers may be formulated into coating compositions designed for the particular application in question. Two such applications are described below:

CHLORINATED BUTENE-1 POLYMER COATINGS FOR POLYOLEFIN SUBSTRATES

The chlorinated butene polymer coating materials may be directly coated upon polyethylene, polypropylene or other polyolefin films, sheets or the like, in hot melt form or in solution in one of the solvents described hereinabove. Moreover, the chlorinated material may be admixed with any of a large number of additives known to impart predetermined characteristics to polyolefin substrates. Such additives may include oil-soluble, phenol-formaldehyde resin tackifiers, metal oxide bonding agents, antioxidants, accelerators, U.V. stabilizers, thermal stabilizers, co-elastomers, fillers, and organic and/or aqueous solvents for the resulting coating system.

Tackifiers useful in the adhesive compositions of the present invention comprise the oil-soluble phenol-formaldehyde resins of both the heat-reactive and heat nonreactive types. The heat-reactive resins are generally alkaline catalyzed, having a phenol-to-formaldehyde ratio of about 2 to 1. The heat nonreactive resins, on the other hand, are generally acid catalyzed and have a phenol-to-formaldehyde ratio of about 1 to 1. The phenol moieties of the tackifier condensates are generally substituted, and may contain alkyl, cycloaliphatic monovalent hydrocarbon, aromatic, or terpene radicals.

It is preferred to employ heat-reactive, phenolformaldehyde tackifiers in the coating compositions, particularly those constituted of t-butyl phenol-formaldehyde condensates. Such materials are suitably added in the proportion of from about 2 to 60, and preferably from about 30 to 50, parts of tackifier per 100 parts of the chlorinated butene-1 polymer constituent. When the coating system additionally contains a magnesium, zinc or other metal oxide bonding material such heat-reactive tackifiers react with the metal oxide constituent, upon coating, to form modified resins having high melting points.

The metal oxide materials may be added to the chlorinated polybutene compositions to provide increased bond strength at elevated temperatures. Metal oxides so useful include, for example, cadmium oxide, lead oxide, and titanium oxide, in addition to the magnesium and zinc oxides referred to above. Such oxides are desirably added in the proportion of from about 1 to 15, preferably from about 3 to 10, parts per 100 parts of the chlorinated polybutene.

Antioxidants which may also be incorporated in the chlorinated polybutene coating compositions include N-phenyl-beta-naphthylamine, octamine, phenothiazine, aldehydeamine condensation products, 4, 4'-butylidene bis (6-tert.-butyl-m-cresol), and substituted alkyl phenols.

In order to facilitate curing of the resinous composition, suitable accelerators may additionally be incorporated therein. Accelerators which may so be employed include mercaptoimidozoline; trimene base (triethyl trimethylene triamine); butyraldehyde-aniline condensation products; butyraldehyde butylamine condensation products; di-o-tolylguanidine; the di-o-tolyguanidine salt of dicatechol borate (commercially available as the active ingredient of Permalux); methylene bis(4-phenylisocyanate), and other di-isocyanates; N-tetramethyl thiuram disulfide (commercially available as Thiuram); thiocarbanilide; lead oxide; and sodium dibutyl dithiocarbamate. Such materials may be admixed in amounts of from about 0.01 to 20, and preferably from 0.1 to 8, parts per 100 parts of the chlorinated polybutene.

For certain applications, it may additionally be desirable to blend the chlorinated butene polymer with a co-elastomer to improve the bonding or other characteristics of the coating. Co-elastomers which are so useful include natural rubber, styrene-butadiene rubbers, chlorinated polyethylene elastomers, chlorinated polypropylene elastomers, polychloroprene, polyacrylates, ethylene propylene rubbers, cis-polybutadiene, and cis-polyisoprene.

The additional materials which may be incorporated in the chlorinated butene polymer coating compositions may comprise any of those conventionally employed in the art to improve the properties of polyolefin substrates or coatings formed thereon, Thus, fillers which may be incorporated in the coating composition include carbon black, calcium silicate, silica, clay, asbestos, or other known filler materials. Finally, the solvent system may include water and/or any of the organic solvents specified hereinabove or conventionally employed in the art. It will be understood that those skilled in the art will determine the particular solvent media and other coating ingredients in accordance with the several constituents of the coating composition and the application for which such composition is intended.

The chlorinated polybutene coating compositions may be applied to the polyolefin substrate(s) to be treated (with or without pre-cleaning) under normal ambient conditions, and thereafter permitted to dry. On the other hand, curing of the coating may be expedited by drying the same at elevated temperatures. The dried coating thus formed may be employed directly as a primer coat for the application to the polyolefin surface of printing inks, paints or the like. Alternatively, when it is desired to employ the chlorinated polybutene-1 in the formation of an adhesive joint, the coated article is applied to the surface to which it is to be adhered while the coating is tacky, either prior to drying the same to the tack-free state or by reactivating the same with a suitable solvent.

2. Chlorinated butene-1 polymer/wax blends for coating paper stocks.

As described in the aforesaid U.S. Pats. Nos. 3,326,834-5, paper stock materials are frequently coated with petroleum wax compositions to provide protective coatings thereon in the formation, for example, of low cost cartons for liquids. One important characteristic of such a coating is the so-called creased barrier property of the coated materials, viz., the ability of the coating in question to minimize the passage of water vapor through the creased or folded paper or paperboard stock material. Such property may be measured by determining the creased water vapor transmission (WVTR) in accordance with the standardized test described in TAPPI 465 creased WVTR.

It has been found that blends of petroleum waxes with chlorinated butene-1 polymers exhibit excellent WVTR values as compared with other wax/resin blends. Thus, the aforesaid Pat. No. 3,326,834 indicates that polybutene-1 resins having higher isotacticities than 70 percent have relatively poor WVTR values, thus preventing the use of such materials in wax blends for coating of paper stock materials. On the other hand, it has been determined in accordance with the present invention, that the corresponding chlorinated polybutene-1 resins hereof impart markedly superior WVTR values to wax blends containing the same, such materials, as well as chlorinated butene-1 polymers of lower isotacticity, thus being useful for improving the creased barrier properties of coated paper stocks. Moreover, and as indicated in the examples set forth hereinafter, it has been found that coatings comprising blends of chlorinated polybutene-1 resins and petroleum waxes exhibit improved adhesion to the substrate treated, increased tensile strength, and superior flexibility and gloss characteristics as compared with wax-resin blends incorporating the corresponding unchlorinated butene-1 polymers.

The chlorinated materials may be blended with any of a large variety of waxes for the purposes of the present invention. Petroleum waxes having melting points in the range of from about 120° to 190° F., and including paraffin waxes, microcrystalline waxes, and intermediate waxes constituting blends or mixtures of paraffin and microcrystalline waxes, may be so employed. The chlorinated butene-1 polymers may alternatively be blended with other waxes including candelilla, carnauba, spermaceti or montan wax, to provide suitable coating compositions. Suitably, the chlorinated resinous material is blended with the wax carrier in an amount of from about 5 percent to 50 percent, preferably from about 10 percent to 40 percent, by weight of the resulting blend.

Other modifying constituents may additionally be incorporated in the wax/chlorinated butene-1 polymer blend. Conventional modifiers which may be so blended include the following: terpene, coumarone, styrene-modified coumarone/indene, phenol-formaldehyde, chlorinated phenyl, rosin and rosin ester resins.

Modifiers which have been found particularly advantageous in improving the chlorinated butene/wax blend coating compositions hereof include various oil insoluble olefin copolymers and terpolymers. Such materials have been found to markedly improve flexibility of the chlorinated butene-1 polymer coatings on paper stock substrates, and to provide tougher coatings than are otherwise obtained.

Preferred copolymer materials thus employed comprise the copolymers of butene-1 with propylene, ethylene, 3-methyl-1-pentene or decene-1; and the copolymers of ethylene and propylene. Employing butene-1/propylene copolymers, for example, it is preferred to utilize compositions prepared from monomeric mixtures containing from 5 percent to 75 percent, desirably from 10 percent to 50 percent, of the propylene monomer. The isotacticity of such copolymers (as determined by their insoluble fractions in diethyl ether) may be as low as 5 percent or as high as 90 percent, it being preferred to employ butene-1/propylene copolymers having isotactic contents of from 40 percent to 90 percent, desirably from 50 percent to 80 percent.

The terpolymer modifiers which have been found advantageous comprise butene-1/propylene/$C_5$–$C_{20}$ alpha-olefin polymerizates. The latter monomeric constituent is preferably an alphaolefin having a chain length of from eight to 12 carbon atoms, e.g., dodecene-1. Such polymers are suitably prepared from monomeric compositions possessing proportions within the following ranges: butene-1—50–80 weight percent; propylene—48–18 weight percent; $C_5$-$C_{20}$ alpha-olefin—2–32 weight percent. Such materials possess isotactic contents which, like the copolymers discussed above, may be as low as 5 percent or as high as 90 percent, it being preferred to utilize terpolymers having from 40 percent to 90 percent and, desirably, from 50 percent to 80 percent, crystalline contents.

When the chlorinated butene polymer is blended with waxes and the noted copolymer and terpolymer modifiers, such are desirably admixed in the proportion of from about 40 to 90 parts of wax, 5 to 55 parts of the chlorinated butene polymer, and 5 to 55 parts of the indicated copolymers or terpolymers.

The wax/chlorinated butene-1 polymer blends may be coated on desired paper stock materials from hot melts employing conventional coating techniques, e.g., by means of a doctor knife or wire wound rod. Upon cooling, coatings thus formed adhere strongly to the paper substrates and possess the various improved properties referred to herein.

The following examples illustrate preferred embodiments of the method and composition of the present invention without, however, being intended as limiting thereof:

1. COATINGS FORMED ON PLASTIC FILM OR SHEET SUBSTRATES

EXAMPLE 1—Chlorinated Polybutene Coatings for Polyethylene and Polypropylene films Samples of high density polyethylene and polypropylene sheet stock, one-eighth inch thick, were wiped with toluene and coated with a 10 percent toluene solution of chlorinated polybutene-1 (18 percent chlorine) to provide dry film thicknesses of 0.1 mil. Each coated sheet was dried at 150° F. for 30 seconds and thereafter top-coated with an acrylic lacquer to 3.5 mils dry film thickness. The coated sheets were then dried at 150° F. for one minute.

The coated sheets were then subjected to the following adhesion test:

Initially, two sets of parallel cuts, one-eighth inch apart and at right angles to each other, were made with a razor blade through each coating and into the substrate to form a diamond crosshatch pattern therein. Pressure-sensitive cellophane adhesive tape was firmly applied over the crosshatched areas and allowed to stand 30 minutes. The tape was then rapidly pulled from the surface. In each case, none of the coating adhered to the tape. There was no lifting of the coating in the crosshatched areas.

Identical tests run on like polyethylene and polypropylene film stock samples coated with the acrylic lacquer without the chlorinated polybutene-1 primer coat, resulted in 100 percent removal of the test coatings.

EXAMPLES 2 TO 8—ADHESIVE JOINTS FOR POLYBUTENE FILMS

Polybutene-1 strips of 0.065 inch thickness were coated with a 10 percent toluene solution of chlorinated polybutene (17.7 percent chlorine). The adhesive was applied to one-half square inch areas of several pairs of the polybutene strips.

Each pair of strips was joined when the surfaces were tacky. The joints were thereafter tested in an Instron Tensile Tester for shear strength at a crosshead speed of two inches per minute.

The surfaces of the two polybutene strips joined in example 2 were coated directly with the adhesive, and the coated strips thereafter joined while the treated surfaces were yet tacky; a joint was thus produced having a shear strength of 198 p.s.i.

The surfaces of the pairs of polybutene strips joined in examples 3 through 7, inclusive, were directly coated with the adhesive, and allowed to dry. The adhesive coatings were subsequently reactivated by treatment with toluene, the thus tackified surfaces being joined. Joints were thus produced having shear strengths varying from 200 to 260 p.s.i.

The surfaces of the two polybutene strips joined in example 8 were initially wiped with toluene prior to the application of the adhesive. The adhesive was then applied to the precleaned surfaces and allowed to dry, and the surfaces reactivated with toluene prior to forming the adhesive joint. A shear strength of 324 p.s.i. was thus obtained.

The strip thicknesses, bond areas and shear strengths obtained in examples 2 to 8, inclusive, are tabulated in table I below:

TABLE 1

Shear Strengths Of Polybutene Adhesive Joints Using Chlorinated Polybutene In Toluene

| Example No. | Strip Thickness (in.) | Bond Area (in. × in.) | Shear Strength p.s.i. |
|---|---|---|---|
| 2 | 0.06 | ½×1 | 198 |
| 3 | 0.06 | ½×1 | 262 |
| 4 | 0.06 | ½×1 | 256 |
| 5 | 0.06 | ½×¾ | 229 |
| 6 | 0.06 | ½×¾ | 198 |
| 7 | 0.136 | ½×1 | 260 |
| 8 | 0.06 | ½×1 | 324 |

EXAMPLES 9 TO 27—ADHESIVE JOINTS FOR POLYBUTENE FILMS EMPLOYING COMPOUNDED CHLORINATED POLYBUTENE ADHESIVES

In each of the following examples a chlorinated polybutene material (17.7 percent chlorine) was milled for 5 minutes at a temperature of 60°–80° C. on a two-roll rubber mill. Per each 100 parts of the chlorinated polybutene, 2 parts of N-phenyl-beta-naphthylamine antioxidant and 5 parts zinc oxide were blended into the polymer. Differing contents of tackifiers, metal oxide bonding agents, reinforcing silica fillers, and accelerators were then added to form the adhesive compositions of the respective examples.

A heat-reactive phenol-formaldehyde tackifier resin and a hydrophobic silica filler were incorporated in each of the compositions of examples 9 to 21. The tackifier resin additives were alkaline-catalyzed, t-butyl phenol-formaldehyde condensates having phenol to formaldehyde ratios of about 2 to 1; the particular tackifier employed in the compositions of examples 9 to 13, inclusive, was commercially available under the designation "CKR 1734," whereas the tackifier employed in the compositions of examples 14 to 21, inclusive, was commercially available under the designation "Durez 12603."

The aforesaid "CKR 1734" tackifier, red lead, an accelerator, and magnesia (in the amount of 6 parts per 100 parts of the chlorinated polybutene), were admixed in each of the materials of example 22 to 27, inclusive. The accelerators thus employed comprised a butyraldehyde-butylamine condensation product (examples 22–25), or mercaptoimidazoline (examples 26 and 27).

The several compositions were prepared from a master batch composed of the chlorinated polybutene, the zinc oxide, the N-phenyl-beta-naphthylamine and, in the case of the compositions of examples 22–27, the magnesia constituent, in the proportions identified above. To each portion of the respective master batches (containing, as noted, 100 parts of the chlorinated polybutene) were added 480 parts of toluene, 1 part water, and the proportions of tackifier, silica, red lead, and accelerator identified in table II below, expressed on the basis of 100 parts of the chlorinated butene polymer.

The thus formed compositions were applied to polybutene strips, selected ones of which were precleaned with toluene, the treated surfaces dried to the tack-free state, and subsequently reactivated with toluene. Pairs of the thus treated strips were then bonded and the resulting shear strengths determined as described above in connection with examples 2–8.

The proportions of the respective ingredients of the adhesive compositions of examples 9–27, the parameters of the bonding techniques employed in such examples, and the shear strengths obtained and determined therein, are all tabulated in table II below:

TABLE II.—SHEAR STRENGTHS OF POLYBUTENE ADHESIVE JOINTS USING COMPOUNDED CHLORINATED POLYBUTENE ADHESIVES

| Ex. No. | Parts tackifier | Parts silica filler | Parts red lead | Parts accelerator | Strip thickness (in.) | Bond area (in. × in.) | Surface pre-treatment | Shear strength (p.s.i.) |
|---|---|---|---|---|---|---|---|---|
| A—CHLORINATED POLYBUTENE COMPOUNDED WITHOUT MAGNESIA |
| 9 | 40 | 2 | | | .06 | ½×1 | None | 287 |
| 10 | 40 | 2 | | | .06 | ½×⅜ | do | 290 |
| 11 | 40 | 2 | | | .06 | ½×¾ | do | 185 |
| 12 | 40 | 2 | | | .136 | ½×1 | do | 254 |
| 13 | 40 | 2 | | | .06 | ½×1 | Toluene | 368 [1] |
| 14 | 40 | 2 | | | .06 | ½×1 | None | 268 |
| 15 | 40 | 2 | | | .06 | ½×⅜ | do | 269 |
| 16 | 40 | 2 | | | .06 | ½×¾ | do | 196 |
| 17 | 40 | 2 | | | .136 | ½×1 | do | 274 |
| 18 | 40 | 2 | | | .06 | ½×1 | Sanded only | 320 [1] |
| 19 | 40 | 2 | | | .06 | ½×1 | Toluene | 340 [1] |
| 20 | 40 | 2 | | | .06 | ½×1 | do | 320 |
| 21 | 40 | 2 | | | .136 | ½×1 | do | 400+ |
| B—CHLORINATED POLYBUTENE COMPOUNDED WITH MAGNESIA |
| 22 | 45 | | 10 | 5 | .06 | ½×1 | None | 244 |
| 23 | 45 | | 10 | 5 | .06 | ½×1 | Toluene | 372 [1] |
| 24 | 45 | | 10 | 3 [2] | .06 | ½×1 | None | 243 |
| 25 | 45 | | 10 | 3 [2] | .06 | ½×1 | Toluene | 376 [1] |
| 26 | 45 | | 10 | 1 | .06 | ½×1 | None | 253 |
| 27 | 45 | | 10 | 1 | .06 | ½×1 | Toluene | 360 [1] |

[1] Polybutene strips yielded before the adhesive joint broke.
[2] Accelerator additionally included 3 parts of sulfur.

EXAMPLES 28–42—ADHESIVE JOINTS FOR POLYBUTENE FILMS EMPLOYING RUBBER-CHLORINATED POLYBUTENE BLENDS

Adhesive compositions were prepared incorporating polychloroprene (commercially available as "Neoprene AD") and, per 100 parts of such elastomer, 5 parts of zinc oxide, 2 parts of the N-phenyl-beta-naphthylamine antioxidant, and differing proportions of the chlorinated polybutene adhesive, a heat-reactive phenolic resin tackifier, magnesia, red lead, an accelerator, and a hydrophobic silica filler.

The formulations of the respective compositions are set out in table III below. Per each 100 parts of the polychloroprene the compositions of examples 28 to 33 and 40 to 42 each contained 6 parts of magnesia, whereas no magnesia was incorporated in the formulations of examples 34 to 39. Tackifiers of the alkaline catalyzed, t-butyl phenol-formaldehyde resin type (phenol:formaldehyde ratio of 2:1) were contained within each composition, the formulations of examples 28–36 incorporating that tackifier commercially available under the designation "CKR 1734," the example 37 composition incorporating "Durez 12603," examples 38 and 39 containing a mixture of 40 parts of "CKR 1734" and 40 parts of "Durez 12603," and examples 40–42 comprising a similar tackifier available under the designation "SP 1056." As regards the accelerators or curing agents, mercaptoimidazoline (commercially available as "NA- 22") was incorporated within the compositions of examples 31 to 33, whereas a butyraldehyde-butylamine condensation product accelerator was admixed with the formulations of examples 34 to 36 and 40 to 42, inclusive.

The respective compositions of examples 28 to 42 were prepared by milling the polychloroprene components for 5 minutes on a two-roll rubber mill at a temperature of 60° to 20° C. and thereafter adding the zinc oxide, N-phenyl-beta-naphthylamine and, in the case of the compositions of examples 28–33 and 40–42, the magnesia constituent to the polychloroprene on the mill. The remaining constituents of the respective compositions, including one part of water and 480 parts of toluene solvent per 100 parts of the polychloroprene constituent, were thereafter added to the milled rubber master batches thus prepared.

Adhesive joints were prepared in the manner described above in connection with examples 9 to 27, without pretreatment of the polybutene strips coated. The shear strengths exhibited by the respective joints were then determined employing the apparatus described in connection with examples 2 to 8.

The adhesive joints formed by the compositions of examples 28 to 33 exhibited shear strengths of from 334 to 360 p.s.i., the strips yielding slightly before failure of the respective joints. The highest shear strength and the most severe yield characteristics were observed with adhesive compositions containing 20 or 50 parts of the chlorinated polybutene-1 per 100 parts of the polychloroprene. In the case of the formulations of examples 34 to 39, the highest shear strengths were obtained employing adhesive compositions incorporating, on the indicated basis, 50 parts of the chlorinated butene polymer. Finally, in the case of the compositions of examples 40–42, it was noted that the shear strength of the adhesive joints increased from 138 to 189 p.s.i. as the amount of chlorinated polybutene was increased from 25 to 100 parts, per hundred parts of the polychloroprene The proportions of the compositions of examples 28 to 42 and the bonding techniques and shear strengths exhibited by the polybutene joints of such examples are fully set forth in table III below:

TABLE III.—SHEAR STRENGTHS OF POLYBUTENE JOINTS USING RUBBER-CHLORINATED POLYBUTENE BLENDS

| Ex. No. | Parts chlorinated polybutene | Parts tackifier | Parts silica filler | Parts red lead | Parts accelerator | Shear strength (p.s.i.) |
|---|---|---|---|---|---|---|
| A—POLYCHLOROPRENE MILLED WITH MAGNESIA | | | | | | |
| 28 | 5 | 45 | | 10 | | 1 348 |
| 29 | 20 | 45 | | 10 | | 1 334 |
| 30 | 50 | 45 | | 10 | | 1 360 |
| 31 | 5 | 45 | | 10 | 1 | 336 |
| 32 | 20 | 45 | | 10 | 1 | 1 354 |
| 33 | 50 | 45 | | 10 | 1 | 1 358 |
| B—POLYCHLOROPRENE MILLED WITHOUT MAGNESIA | | | | | | |
| 34 | 5 | 40 | 2 | 10 | 5 | 296 |
| 35 | 20 | 40 | 2 | 10 | 5 | 279 |
| 36 | 50 | 40 | 2 | 10 | 5 | 1 324 |
| 37 | 5 | 40 | 2 | | | 219 |
| 38 | 20 | 80 | 2 | | | 314 |
| 39 | 50 | 80 | 2 | | | 258 |
| C—RECLAIMED RUBBER MILLED WITH MAGNESIA | | | | | | |
| 40 | 25 | 45 | | 10 | 5 | 138 |
| 41 | 50 | 45 | | 10 | 5 | 156 |
| 42 | 100 | 45 | | 10 | 5 | 189 |

[1] Polybutene strips yielded before the adhesive joint broke.

EXAMPLE 43—CHLORINATED POLYBUTENE-1 ADHESIVE INK FOR POLYPROPYLENE FILM 44—CHLORINATED

A 10 percent solution of chlorinated polybutene-1 (20 percent chlorine) in ethyl acetate was ball milled with 4 parts (per 100 parts of the chlorinated butene polymer) of a pigment grade carbon black. After suitable pigment dispersion was obtained (6 hours milling time), the dispersion was separated from the balls and was used for printing on polypropylene film. A fast drying ink with excellent adhesion to the polypropylene substrate was thus obtained.

EXAMPLE 44—CHLORINATED POLYBUTENE-1 ADHESIVE PRIMER FOR POLYESTER FILM

Example 1 above was repeated, applying the chlorinated polybutene-1 primer coat and the subsequent acrylic lacquer coating to a polyester film (Mylar) in the form of a sheet of 20 mil thickness. The results obtained were substantially the same as those described hereinabove in connection with example 1.

2. COATINGS FORMED ON PAPER STOCK MATERIAL SUBSTRATES

EXAMPLE 45—CHLORINATED POLYBUTENE-1/PARAFFIN WAX BLEND ON PAPERBOARD

A wax blend with a chlorinated polybutene-1, containing 7 percent chlorine, was prepared for use in coating milk paperboard. Initially, 80 grams of a fully refined paraffin wax (138/140 AMP, having a distilling temperature of 750°–810° F.) was heated at 140° C. in a 400 ml. beaker. To this melt, 20 grams of the chlorinated butene-1 polymer was slowly added. The melt was stirred to homogeneity as indicated by its clarity.

The clear, hot blend was applied to milk paperboard by doctoring. The coating had good adhesion to the paperboard, no peeling, cracking, or flaking occurring upon creasing the substrate 180°. The tensile strength of the coated paperboard was increased to 65 p.s.i. (as compared to 59 p.s.i. for the uncoated substrate). Moreover, the coating imparted a higher gloss, increased hardness and abrasion resistance, faster melt-setting characteristics, and improved vapor barrier properties, as compared with similar wax blends with, for example, polyethylene or polypropylene resins.

It was further noted that coatings of the composition of example 45 possessed improved toughness characteristics, and were particularly adherent to glassine paper substrates.

EXAMPLE 46—CHLORINATED POLYBUTENE-1/MICROCRYSTALLINE WAX BLEND ON PAPERBOARD

Example 45 was repeated, replacing the paraffin wax constituent with a microcrystalline wax having a distilling temperature of 950°–1050° F.; and substituting a chlorinated polybutene-1 resin constituent having a chlorine content of 24 percent, and being derived from polybutene-1 having a melt index of 10.0 and an isotactic content of 60 percent, for the chlorinated polybutene employed in the prior example.

The milk paperboard coated with the resulting blend was found to possess improved properties as compared with similar paperboard coated with wax/polybutene-1 compositions per se. Specifically, the chlorinated polybutene-1 containing coating possessed increased adhesion to the substrate, imparted higher tensile strength (in the range of 65–70 p.s.i.), and improved the flexibility and gloss of the coated paperboard.

EXAMPLE 47—CHLORINATED BUTENE-1/PROPYLENE COPOLYMER/WAX BLEND ON PAPERBOARD

Example 46 was repeated, employing a chlorinated butene-1/propylene copolymer in place of the chlorinated polybutene-1 resin constituent of such example. The chlorinated copolymer was prepared from a monomeric mixture of butene-1 and propylene in the proportion of 70 parts of the former per 30 parts of the latter, the resulting copolymer having a melt index of 9.0 and an isotactic content of 65 percent prior to chlorination. The chlorinated copolymer had a chlorine content of 30 percent.

Upon blending the chlorinated copolymer with the microcrystalline wax and applying the same to milk paperboard in the manner described in example 45, the coated board was found to exhibit advantages similar to those disclosed in connection with such example.

EXAMPLE 48—CHLORINATED POLYBUTENE-1/OLEFIN COPOLYMER/WAX BLEND ON PAPERBOARD

A blend of a chlorinated polybutene-1 resin with a butene-1/propylene copolymer and a paraffin wax for coating milk paperboard was prepared as follows:

Initially, 80 grams of a fully refined paraffin wax (138/140 AMP, having a distilling temperature of 750°–810° F.) was heated at 140° C. in a 400 ml. beaker. To this melt was slowly added, with stirring, 20 grams of butene-1/propylene copolymer and 8 grams of the chlorinated polybutene-1. The mixture was continuously stirred and heated until the blend became clear and homogeneous.

The butene-1/propylene copolymer was prepared by reaction of the indicated monomers in the proportion of 80 parts of butene-1 per 20 parts of propylene. The resulting copolymer had a crystallinity content (as determined by ether insolubles) of 60 percent.

The chlorinated polybutene-1 was prepared from a polybutene containing 92 percent isotactic material, the chlorinated polymer having a chlorine content of 18 percent.

The wax/resin blend thus prepared was applied to milk paperboard as described above to form a coating having good adhesion to the substrate and possessing the further advantageous characteristics described in example 45. The coating of this example was exceptionally tough. Moreover, coatings prepared from the instant formulation were found to exhibit particularly outstanding adhesion when coated on glassine or pouch paper substrates.

EXAMPLE 49—CHLORINATED POLYBUTENE-1/OLEFIN TERPOLYMER/PARAFFIN WAX BLEND ON GLASSINE PAPER

A blend of chlorinated polybutene-1 resin with a terpolymer of butene-1, propylene and dodecene-1, and paraffin wax was prepared, for application to paper stock substrates.

Initially, 80 grams of a fully refined paraffin wax (138/140 AMP, having a distilling temperature of 750°–810° F.) was heated at 140° C. in a 400 ml. beaker. To the melt was slowly added a butene-1/propylene/dodecene-1 terpolymer having a weight ratio of 80/10/10 of the indicated monomers and a crystallinity content of 55 percent. To the blend thus formed 10 grams of chlorinated polybutene-1, having a chlorine content of 18 percent, were slowly added, the mixture being stirred and heated until it became clear and homogeneous.

Upon coating the resulting blend from the hot melt in the manner described in the preceding examples, the coatings exhibiting the advantageous properties referred to in example 45 were obtained. Such coatings were found to be particularly tough, and to exhibit outstanding adhesion to glassine or pouch paper substrates, in particular.

It will be understood that various changes may be made in the preferred embodiments described hereinabove without departing from the scope of the present invention. Accordingly, the preceding description should be construed as illustrative and not in a limiting sense.

We claim:

1. A method for treating a polyolefin support to increase the adhesion of materials thereto, which comprises a applying to said support, in hot melt form, a coating composition consisting essentially of, as the principal substance bonding the composition to said support, a chlorinated butene-1 polymer prepared from a butene-1 polymer having a melt index of from 0.1 to 60 and a crystallinity of from 20 percent to 95 percent by weight isotactic polymer, the chlorinated butene-1 polymer containing from 3 percent to 70 percent by weight 2. The method of claim 1, in which said chlorinated butene-1 polymer is prepared from a butene-1 polymer having a melt index of from 0.5 to 20 and a crystallinity of from 40 percent to 92 percent by weight isotactic polymer, the chlorinated butene-1 polymer containing from 5 percent to 50 percent by weight chlorine.

3. The method of claim 1, in which said chlorinated butene-1 polymer is a homopolymer of butene-1 or a copolymer of at least 50 percent by weight of said monomer copolymerized with an olefinically unsaturated monomer copolymerizable therewith.

4. The method of claim 1 wherein the coating composition additionally contains tackifiers, bonding agents, antioxidants, accelerators, u.v. stabilizers, thermal stabilizers, co-elastomers and fillers.

5. A method for treating a polyolefin support to increase the adhesion of materials thereto which comprises applying to said support, dispersed in an organic solvent-containing medium, a coating composition consisting essentially of, as the principal substance bonding the composition to said support, a chlorinated butene-1 polymer prepared from a butene-1 polymer having a melt index of from 0.1 to 60 and a crystallinity of from 20 percent to 95 percent by weight isotactic polymer, the chlorinated butene-1 polymer containing from 3 percent to 70 percent by weight chlorine.

6. The process of claim 5 wherein the polyolefin is selected from the group consisting of polyethylene, polypropylene and polybutene; the chlorinated butene-1 polymer has a melt index of about 0.5 to 20, a crystallinity of about 40 percent to 92 percent and a chlorine content of about 5 to 50 percent and wherein the coating composition is applied to the support without pretreating the support.

7. A method of treating a polybutene support for the purpose of facilitating the bonding of polybutene thereto which comprises applying to said support, dispersed in an organic solvent-containing medium, a coating composition consisting essentially of, as the principal substance bonding the composition to said support, a chlorinated butene-1 polymer prepared from a butene-1 polymer having a melt index of from 0.1 to 60 and a crystallinity of from 20 percent to 95 percent by weight isotactic polymer, the chlorinated butene-1 polymer containing from 3 percent to 70 percent by weight chlorine.

* * * * *

UNITED STATES PATENT OFFICE
CERTIFICATE OF CORRECTION

Patent No. 3,619,272          Dated November 9, 1971

Inventor(s) Thomas H. Shepherd and Murray H. Reich

It is certified that error appears in the above-identified patent and that said Letters Patent are hereby corrected as shown below:

Column 12, line 28, after "percent by weight" read - - chlorine. - -

Signed and sealed this 11th day of April 1972.

(SEAL)
Attest:

EDWARD M. FLETCHER, JR.
Attesting Officer

ROBERT GOTTSCHALK
Commissioner of Patents